United States Patent [19]

Wiblin

[11] Patent Number: 5,070,247
[45] Date of Patent: Dec. 3, 1991

[54] COLLAPSIBLE DETECTOR FOR SHORT AND LONG TERM MEASUREMENTS OF RADON GAS

[75] Inventor: Claude M. Wiblin, Summersville, W. Va.

[73] Assignee: Radon Testing Corporation of America, Irvington, N.Y.

[21] Appl. No.: 507,239

[22] Filed: Apr. 10, 1990

[51] Int. Cl.⁵ .............................................. G01T 1/00
[52] U.S. Cl. .................................. 250/472.1; 250/253; 250/255
[58] Field of Search .................... 250/472.1, 255, 253

[56] References Cited

U.S. PATENT DOCUMENTS 4,518,860  5/1985  Alter et al. ........................ 250/253
4,847,494  7/1989  Alvarez .............................. 250/253

*Primary Examiner*—Constantine Hannaher
*Assistant Examiner*—James Beyer
*Attorney, Agent, or Firm*—Darby & Darby

[57] ABSTRACT

The device is a collapsible alpha track registration detector which will cost less to use and which can be used for measuring radon concentration over short and long term exposure times. The device includes a collapsible housing, defining an interior volume, in which is a strip of track registration material which forms damage tracks along paths traversed by alpha particles emitted during radioactive decay. The strip is retained within the housing on a cardboard holder to locate the strip at a predetermined location within the housing. The housing is a combination of a gusseted plastic bag and cardboard such that when collapsed it is a flat container but when in use it appears as a prism. The selected cardboard and plastic bag block particles and radon daughter products while admitting air and radon to the interior of the housing. The plastic bag has a hole to allow air to enter when being placed in use but the hole is sealed to one of the cardboard faces which prevents unwanted leakage. The detector includes a data form for entry of exposure information. The device with instructions will fit into a standard business envelope. Following use, the apparatus can become the return mailer.

11 Claims, 1 Drawing Sheet

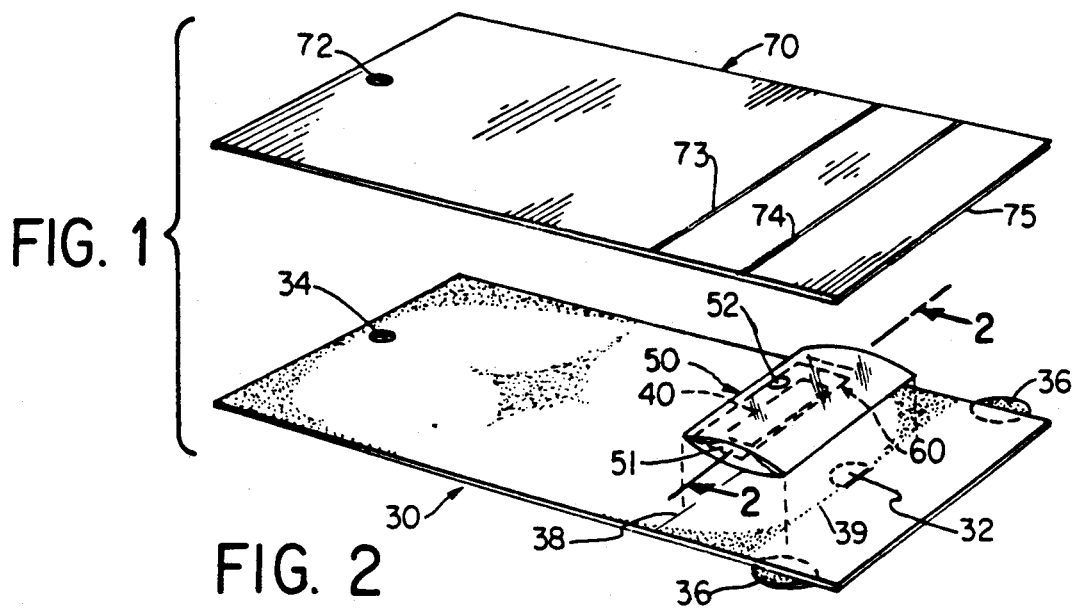
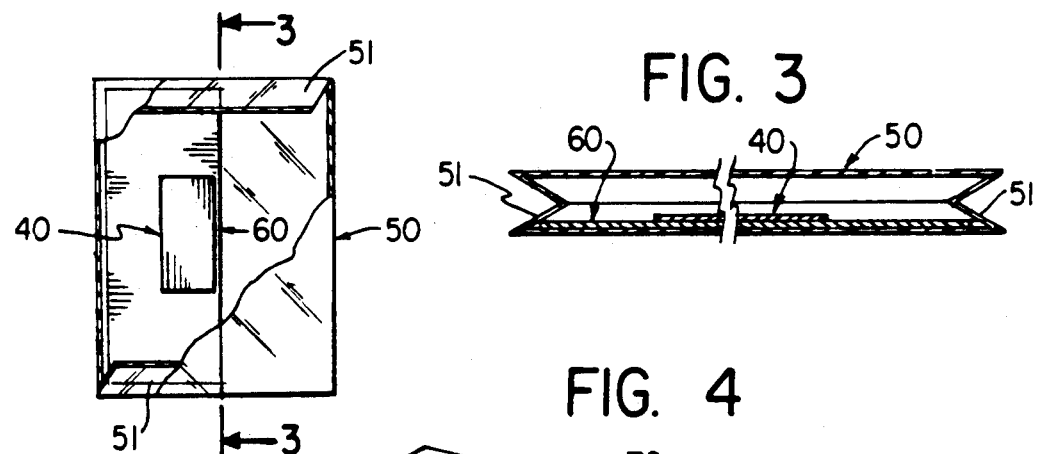
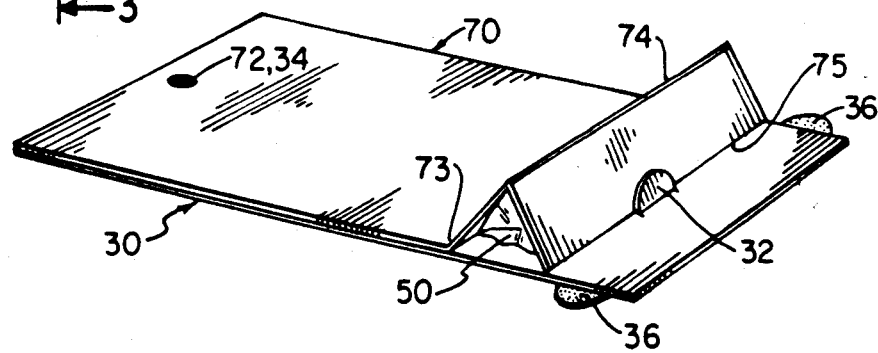
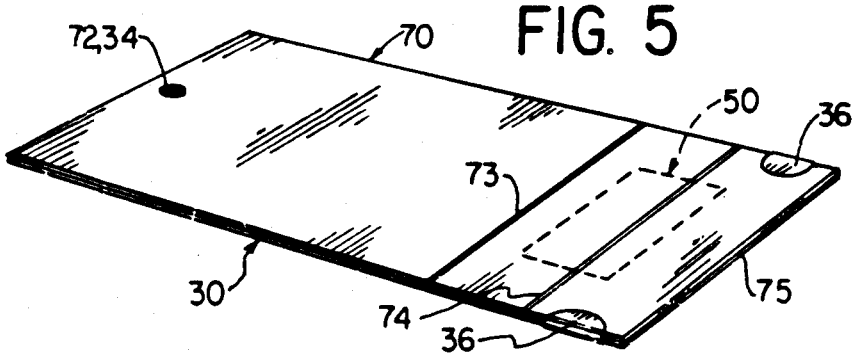

COLLAPSIBLE DETECTOR FOR SHORT AND LONG TERM MEASUREMENTS OF RADON GAS

BACKGROUND OF THE INVENTION

1. Field of the Invention

This invention relates to the detection of ionizing radiation and specifically to an improved apparatus for the detection of radon gas using a track registration material.

2. Prior Art

Measurement of radon gas concentrations by the technique employing track registration material is a known technique and has been found to be effective. One example is the method and apparatus for detecting radon and alpha emitting daughters of radon disclosed and claimed in U.S. Pat. No. 3,665,194 to Alter, et al. for "Radon Detection", the disclosure of which is hereby incorporated by reference. According to this technique, an apparatus containing a track registration material is employed to monitor the presence of alpha particles emitted from radon and radon decay products. If the track registration material is irradiated by alpha particles having sufficient energy to penetrate the surface of the track registration material, minute damage "tracks" are created therein, due to damage of the registration material by the impinging alpha particles. These tracks can be enlarged by contact with a reagent to which the tracks display preferential chemical reactivity as compared to areas apart from the tracks and made visible under magnification.

This radon monitoring technique is usually carried out by placing an apparatus containing a strip of track registration material, in a location to be monitored (such as a dwelling), and permitting the apparatus to remain at the monitored site for a preselected period of time (e.g. several weeks to one year), during which alpha tracks are formed in proportion to the concentration of alpha particle emitting substances. After exposure, each strip of track registration material is subjected to a chemical etching solution, and the number of track etched per unit area on the strip can be counted by microscopic inspection or by electronic scanning techniques. The obtained tracks per unit area data is then used to compute the average radon concentration at the monitored site.

In past applications, efforts have been directed toward designing special track registration detectors dedicated to a particular application. For examples, in U.S. Pat. No. 4,338,523 issued July 6, 1982, for "Low-Cost Track Registration Radiation Detector", a track registration detector is disclosed which is designed specifically for use in monitoring radon levels in interior structures; and in U.S. Pat. No. 4,518,860 issued May 21, 1985, for "Compact Detector for Radon and Radon Daughter Products, another monitor with physical geometry requirements is described which has certain and specific physical geometry requirements. As a result of these requirements, there is a design impediment which requires a rigid and specific geometry for the apparatus housing and the strip location for adequately recording exposure to alpha particles.

This invention also relates to short term monitoring, which heretofore has not been generally performed with alpha track registration material, wherein the objective is monitoring over a period of two days to seven days. Application of track registration material to short term monitoring has not been generally made due to the lack of statistical significance of results at very low exposures and/or over only a short period of time.

Many closed containers perform adequately as long as there is standardization of the particular configuration within the housing and only radon gas and not the radon daughter products are permitted to enter. The best statistical significance is obtained by a large number of tracks. The larger the area analyzed yields a larger number of tracks regardless of the concentration or exposure period. Statistical significance also requires that for small concentrations near the one picocurie per liter level and/or short periods of exposure that any imperfections on the strip's surface which resemble tracks be consistently low in number. The measurement uncertainty depends on the number of tracks counted, variations in track registration material, and the calibration factor. The strips with the indicated and desired quality as stated are commercially available and exposure time requirements can be reduced to two days but may also be allowed for up to one year. An effective track readout system is a microfiche reader which performs adequately for review and combined with a printer, the microfiche allows hard copy images for ease of viewing large areas.

The current suppliers have required placement of the detectors for a minimum of several weeks. Impediments have also occurred due to one or a combination of the following limitations:

(1) a rigid or bulky housing;
(2) the requirements of the physical size of the track registration material used in each detector;
 the requirements for the devices to be boxed for shipment or storage;
(4) the requirement for a separate data information form for the user to maintain; and,
 the need for higher postage fees because of the weight of the device and shipping box.

Thus, a need has existed for a track registration type alpha particle detector which is less expensive to use and which can be used effectively and interchangeably in a wider variety of radon monitoring applications.

SUMMARY OF THE INVENTION

An object of the invention is to provide an improved low most compact detector of minimal size devoid of the above-noted disadvantages and suitable for use for an extremely wide range of monitoring periods.

The apparatus includes a collapsible housing, defining an interior volume in which a strip of track registration material is mounted. The strip is retained within the housing bottom by glue or double backed tape. The collapsible housing is a combination of a sealed gusseted plastic bag and cardboard such that when collapsed it is a flat container but when in use appears as a prism. Three rectangular faces of the prism are made of cardboard. The two end faces which are triangular shaped are formed by the gusseted plastic bag as the device is opened for use. The selected cardboard and plastic bag prevent entry of particles and radon daughter products and admit only air and radon gas to the interior of the housing. The plastic bag must have a hole to allow air to enter when being placed in use. This hole is situated under one of the cardboard rectangular faces with the area surrounding the hole sealed with glue to prevent leakage into the interior housing.

The positioning of the plastic bag, and the cardboard holder assist in protecting the track registration material from radiations emitted from outside the detector during storage. Additional protection is obtained during storage and shipping by the paper envelope and instruction sheets.

The housing cardboard and plastic are fabricated from material substantially devoid of any alpha emitting substance to minimize any alpha particles generated by the housing and thus causing a higher and erroneous result.

The track registration material preferably comprises a rectangle of solid material having an alpha Particle sensitivity lying in the range of about 0.01 to about 8.0 MeV. The material of choice is poly allyl diglycol carbonate (PADC) commonly known as CR-39 plastic with additives particular to each manufacturer.

The apparatus uniquely includes a data form with spaces provided for the insertion of desired exposure data, such as installation data, installation site, removal data, etc. Located near the data form is another hole, which is not part of the housing, which allows the device to be easily hung by string or to be placed over a nail for wall mounting.

The device with instructions will fit into a standard business envelope. Following use, the apparatus becomes a return mailer as it is affixed or preprinted with a return label.

For a fuller understanding of the nature and advantages of the invention, reference should be made to the ensuing detailed description taken in conjunction with the accompanying drawings.

BRIEF DESCRIPTION OF THE DRAWINGS

FIG. 1 is an diagramm exploded view of a preferred embodiment of the invention.

FIG. 2 is a diagrammatic plan view partially broken away of the bag which contains the strip of track registration material.

FIG. 3 is a diagrammatic sectional view across section lines 3—3 of FIG. 2.

FIG. 4 is a diagrammatic perspective view of the preferred embodiment of FIG. 1 in an open condition.

FIG. 5 is a diagrammatic perspective view of the preferred embodiment of FIG. 1 in a closed and sealed condition.

DETAILED DESCRIPTION OF THE PREFERRED EMBODIMENTS

FIG. 1 illustrates in exploded perspective a preferred embodiment of the invention. As seen in this FIG., the invention includes two cardboard sections of manila stock with quality of 11 points, with a gusseted plastic bag 50 (about 2 mil. thick) between them. The top card 70 is designed with two prestamped folds 73, and 74, and can be bent to form a prism. The bottom card 30 has a perforated tab 32 for holding the folded top card in place. Between the cards is a gusseted plastic bag 50 and between its ends 51 two mil., with a hole 52 in the upper side. This hole is approximately ⅛" diameter. Inside the bag 50 is a rectangular piece of cardboard on which is located the track registration material (foil) 40. The foil 40 is glued (or double-back taped) to the cardboard 60 in such a way that when the prism is formed the foil 40 is nearly centered in the bottom part of the prism. The hole 52 is not directly above the foil when in the closed position held by closure tabs 36. Closure tabs 36 are provided to maintain the device closed when not in use.

The cards 30, 70 and bag 50 are held together by glue positioned on the top side of card 30 on the rectangle between lines 38, 39 and on the underside of card 70 on the rectangle between lines 73, 74. An area immediately above the hole 52 may or may not be glued. This hole allows air to enter the bag when it is opened but is situated to allow air to enter but will block particles and radon daughter products. The plastic bag will allow radon to enter from the triangular shaped faces when opened. When closed, the top of the bag lays immediately upon the foil and minimizes any air flow or air pocket in which alpha particles could form and damage the foil. The glue which ends at line 39 on card 30 is intentionally placed to allow the plastic bag to be a boundary of the interior volume of the prism formed when the edge 75 of the top card 70, is pushed and held in place by the tab 32 on card 30.

The holes 72 and 34 are identical in location and size to allow the device to be hung by a string or placed over a nail for wall mounting if desired.

FIG. 4 shows the device in a fully open position and held in place by the tab 32. FIG. 5 illustrates the device in a closed position.

FIGS. 2 and 3 illustrate the positioning of the foil, the hole in the upper side of the bag, the relative size of the card to the bag, and the required location of the card within the gusseted plastic bag. After the card, with foil glued or double back taped in place, the open end of the bag is heat sealed.

It is not necessary that all alpha particles generated in the interior volume of main housing reach the exposed topside of the foil. It is important that only alpha particles which can only originate from gases admitted therein, or decayed products of constituents of such gases, be allowed to cause tracks. Due to the configuration of the component parts, the device is sensitive to certain of the alpha particles generated from radon within the interior volume and not to alpha decays originating outside the device.

The device shown in FIGS. 1-5 yields a uniformity of tracks per unit area across the foil for a given concentration exposure and time period. The housing is sufficiently large to insure that a certain proportion of the alpha particles generated within the housing will be detected by the formation of a permanent damage track in material. Many of the emitted alphas will be directed away from the foil. Further, the radioactive decay must occur close enough to the foil for the alpha particle to strike it.

As suggested by FIG. 2, a serial number may also be incorporated into the track registration material using either visible dyes, physical stamping or the like.

In order to reduce to an absolute minimum the amount of radiation "noise" captured by the foil, the cardboard housing and plastic bag are preferably fabricated from a material essentially devoid of any substances which emit alpha particles living within the range of sensitivity of the registration material 40 (i.e. 0 to 8.0 MEV).

In order to provide the analyst with useful exposure information, an information form has been placed to the side of the prism which has sufficient surface area for the user to print or write in the pertinent information, such as the installation date, removal date, emplacement site or the like.

Detectors fabricated according to foregoing descriptions and accompanying illustrations provide a number of advantages heretofore absent from known alpha particle detectors. Such detectors can be used in virtually any application for track registration in a structure without sacrificing reliability in the data produced over a wider range of radon concentration and time. In this connection, it is noted that the actual physical dimensions of the preferred embodiment of the detector, with nominal dimensions of 4 inches by 9 inches, will fit within a standard size business envelope. When in use, each edge of the triangle part of the prism is about 1.5 inches and the remaining edges are about 4 inches each.

While the above provides a full and complete disclosure of the invention, various modification, alternate constructions and equivalents may be employed without departing from the scope and spirit of the invention. For example, while cardboard filter geometry has been illustrated above the hole in the plastic bag, other geometrical and filtering configurations may be employed, as desired. Therefore, the above should not be construed as limiting the invention, which is defined by the appended claims.

What is claimed is:

1. A detector for detecting radon gas, comprising:
   a collapsible housing having a bottom portion and a top portion, said top portion having folds, said housing defining between said bottom and top portions an interior volume with an open end when said top portion is in a folded condition;
   an interior housing within said interior volume, said interior housing having means for enabling admission of radon gas from outside said open end; and
   track registration means within said interior housing for forming damage tracks along paths traversed by alpha particles which are emitted as a result from decay of the radon gas, said top portion being collapsible from an open position when in said folded condition to a closed position when in an unfolded position, said interior housing defining a space between said interior housing and said track registration means when said top portion is in said open position, said interior housing collapsing said space as said top portion collapses into said unfolded condition so that said interior housing lays immediately on said track registration means, whereby a presence of air flow and air pockets within said interior housing is minimized when said top portion is in said unfolded condition and formation of further damage tracks which would otherwise arise from alpha particles emitted from radon gas in the air flow and air pockets if the space were left uncollapsed is thereby avoided.

2. A detector as in claim 1, wherein said collapsible housing and said interior housing each are devoid of alpha emitting substances.

3. A detector as in claim 1, wherein said top portion includes an information form.

4. A detector as in claim 1, wherein said top portion in said open position and said bottom portion together define a prism shape.

5. A detector as in claim 1, wherein said interior housing protects said track registration means from further exposure to alpha particles from outside when lying immediately on said track registration means.

6. A detector as in claim 1, wherein said interior housing is a plastic bag with a hole formed therein.

7. A detector as in claim 4, wherein said track registration means includes registration material mounted on a base at a position for allowing attainment of a uniform distribution of alpha tracks when the prism shape is formed.

8. A detector as in claim 4, further comprising means for retaining said prism shape.

9. A detector as in claim 8, wherein said retaining means includes a tab in said bottom portion that is foldable into a position against a free side of said top portion.

10. A detector as in claim 1, wherein said housing has tab means for retaining said top portion in said closed position.

11. A detector as in claim 1, wherein said bottom portion has a first tab means for retaining said top portion in said open position and a second tab means for retaining said top portion in said closed position.

* * * * *